No. 689,012. Patented Dec. 17, 1901.
J. LINDNER.
THRESHING MACHINE.
(Application filed Apr. 2, 1901.)
(No Model.) 2 Sheets—Sheet 1.
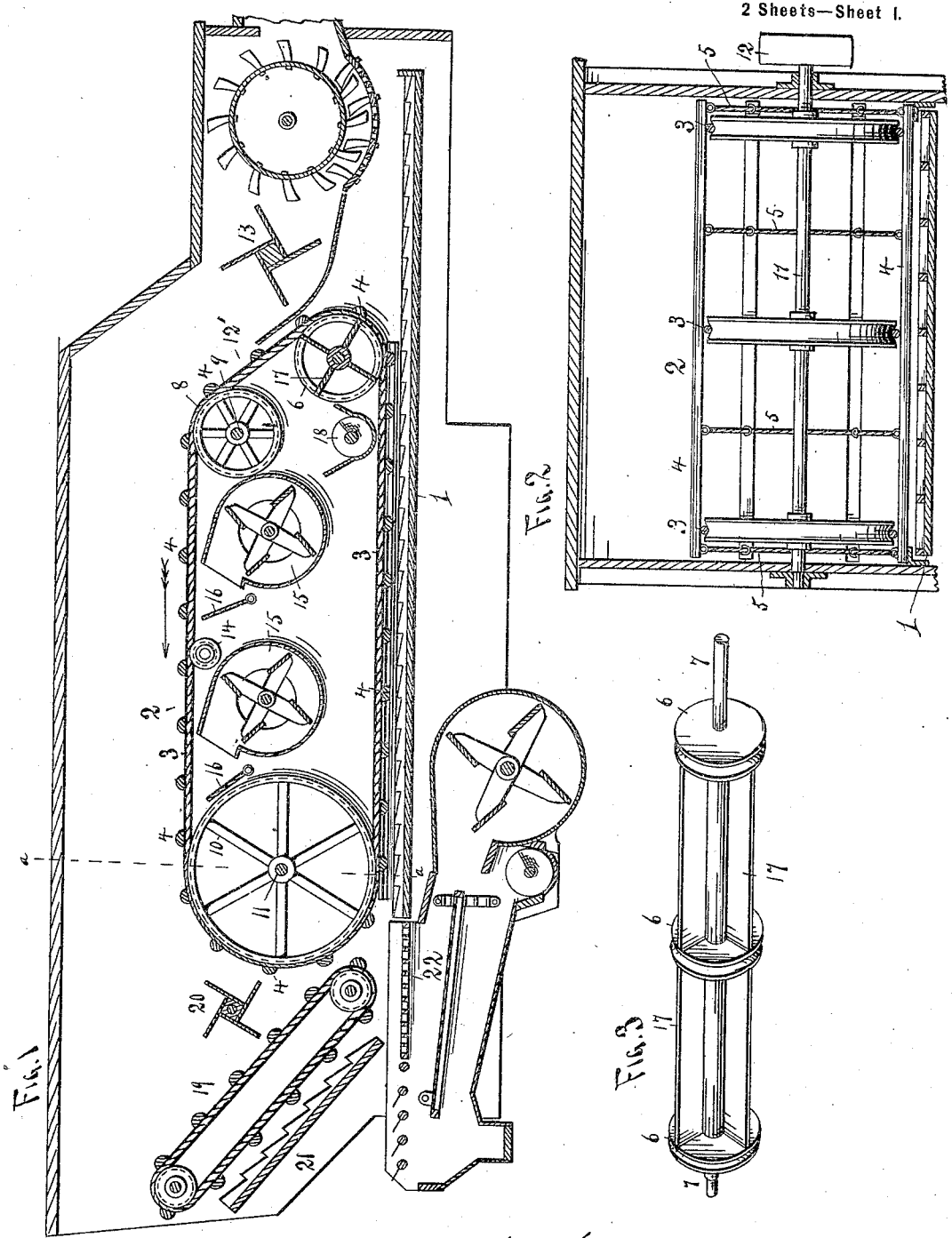

No. 689,012. Patented Dec. 17, 1901.
J. LINDNER.
THRESHING MACHINE.
(Application filed Apr. 2, 1901.)
(No Model.) 2 Sheets—Sheet 2.
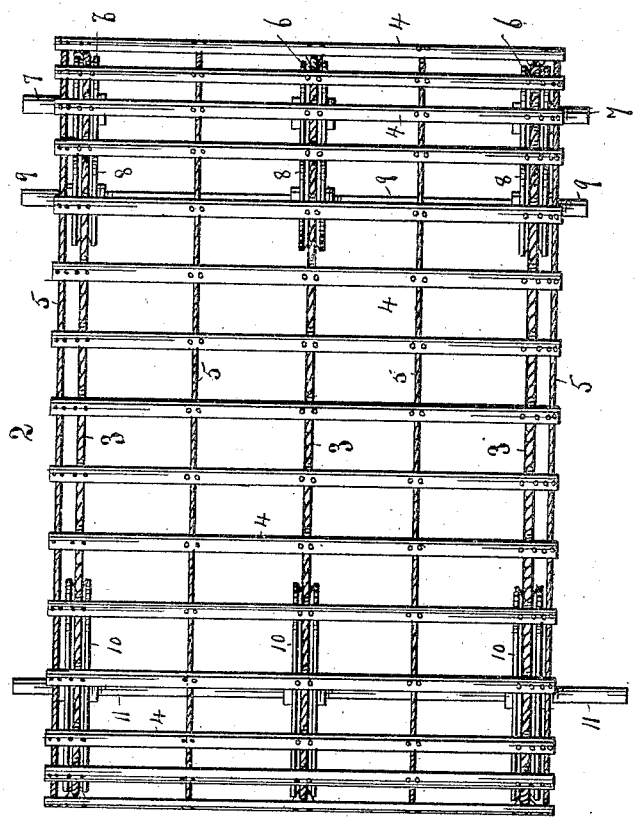
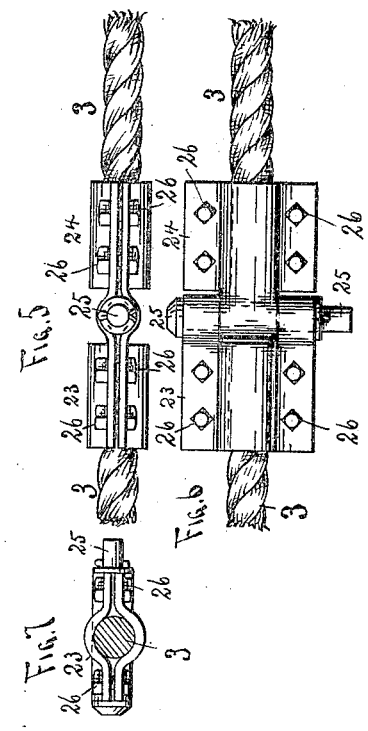
Witnesses
C. N. Woodward
J. W. Garner
John Lindner, Inventor,
By C. A. Snow & Co.
Attorneys

UNITED STATES PATENT OFFICE.

JOHN LINDNER, OF WACONIA, MINNESOTA.

THRESHING-MACHINE.

SPECIFICATION forming part of Letters Patent No. 689,012, dated December 17, 1901.

Application filed April 2, 1901. Serial No. 54,068. (No model.)

*To all whom it may concern:*

Be it known that I, JOHN LINDNER, a citizen of the United States, residing at Waconia, in the county of Carver and State of Minnesota, have invented a new and useful Threshing-Machine, of which the following is a specification.

My invention relates to an improvement in threshing-machines, particularly with relation to the straw-carriers and grain-separators and coacting mechanism; and it consists in the peculiar construction and combination of devices hereinafter fully set forth and claimed.

In the accompanying drawings, Figure 1 is a vertical longitudinal sectional view of a threshing-machine embodying my improvements. Fig. 2 is a vertical transverse sectional view of the same, taken on a plane indicated by the line $a\,a$ in Fig. 1. Fig. 3 is a detail perspective view of the beater that acts with the straw-carrier in throwing the straw onto the ejecting-worm. Fig. 4 is a detail top plan view of the straw-carrier. Figs. 5, 6, and 7 are detail views of the couplings for the ropes or cords which constitute the endless conveying elements of the straw-carrier.

In rear of the threshing mechanism, in the inclosing casing of the machine and above the grain-pan 1, is an endless traveling straw-carrier 2, which comprises the endless traveling carrier ropes or cords 3, the cross-slats 4, which are attached to said carrier-ropes, on the outer sides thereof, and the endless cords or ropes 5, which are intermediate of the larger carrier-ropes. The said endless traveling straw-carrier is hence of open construction, so that grain can readily fall therethrough on the grain-pan. The said straw-carrier is supported by pulleys 6 on a shaft 7, pulleys 8 on a shaft 9, and pulleys 10 on a shaft 11. The said shafts have their bearings in the sides of the casing and one of them is in practice provided with a power-pulley, whereby power may be applied to the endless traveling straw-carrier. In Fig. 2 of the drawings I have shown a power-pulley 12 on one end of the shaft 11; but any suitable means may be employed for conveying power to the carrier. The pulleys 6 are disposed a suitable distance in rear of the threshing mechanism and a slight distance above the grain-pan 1. The pulleys 8 are disposed above the pulleys 6 and at a suitable distance in rear thereof. The pulleys 6, 8, and 10 are provided with peripheral grooves which form guides for the carrier-ropes 3. Owing to the positions of the pulleys 8 with respect to the pulleys 6 it will be understood by reference to Fig. 1 that the endless traveling carrier 2 is provided with the inclined portion 12', on which the straw as it is discharged from the threshing mechanism is thrown by a revoluble beater 13, which is of the usual construction and is rotated by the usual means. The said beater serves to throw the straw onto the upper lead of the endless traveling carrier 2, and the extent and capacity of the said carrier are such that the straw cannot clog the machine. Suitable idler-pulleys 14 may be employed to engage the upper leads of the carrier-ropes 3 and prevent the same from sagging under the load of straw. Blowers 15 are disposed under the upper lead of the endless traveling straw-carrier 2, and suitable wind-boards 16 are also provided which serve to deflect the blasts from said blowers upward through the upper lead of the straw-carrier. Hence the blasts from the blowers serve as the straw is carried rearward by the straw-carrier to blow the straw upward and effectually dislodge the grain therefrom, the grain falling through the straw-carrier onto the grain-pan. Any suitable number of the blowers may be employed.

The shaft 7 of pulleys 6 is provided with beaters 17, which are here shown as radial wings that connect said pulleys 6. Immediately in rear of the pulleys 6 and beaters 17, above the lower lead of the straw-carrier 2, is a straw-ejecting worm 18. Some of the straw, particularly when the straw is short, will fall through the upper lead of the straw-carrier onto the lower lead thereof. The beaters 17 and worm 18 prevent the straw from clogging the carrier. The straw as it is carried forward by the lower lead of the carrier is caught by the beaters 17, which throw it onto the worm 18. The latter extends through one side of the machine-casing and discharges the straw from the lower lead of the carrier.

A supplemental straw-carrier 19, which is identical in construction with the carrier 2, is disposed in rear of the latter in an inclined position, and a beater 20, which is identical with the beater 13 or may be of any suitable construction, is disposed in rear of the carrier 2 and above the carrier 19 and serves to shake the straw as the same passes from said carrier 2 to said carrier 19, so that any grain which may remain lodged in the straw that leaves the carrier 2 may be dislodged therefrom and falling through said inclined carrier 19 is caught by the deflecting board or pan 21 and discharged onto the riddle or screen 22, which is in rear of the grain-pan. The ropes or cords of the carriers are of course cylindrical in form and the cross-slats 4, which connect them, have their outer sides rounded. Hence no grain becomes lodged on the endless traveling carriers.

In Figs. 5, 6, and 7 I show the couplings which I employ to connect the ends of the carrier-ropes. Each of the said couplings comprises a pair of separable sections 23 24, which may be connected together by a bolt or pin 25, on which the sections are adapted to turn, and thereby the said sections when the carrier-rope is stretched so that the sections 23 24 at the ends thereof come together are connected together by said pin or bolt 25. Each of the sections 23 24 is clamped on one end of the rope by bolts 26. It will be understood that by these couplings the ends of the carrier-ropes are so connected as to keep said ropes tense and in engagement with the peripherally-grooved pulleys. These couplings also adapt said ropes to be slackened to permit them to be disengaged from said pulleys.

Having thus described my invention, I claim—

1. The combination of a threshing mechanism, an endless traveling carrier comprising endless traveling carrier-ropes, pulleys on which they operate and cross-slats connecting said ropes, a straw-ejector disposed within said carrier above the lower lead thereof, and revoluble beaters, engaged by said lower lead of said carrier, to throw the straw from said lower lead of said carrier onto said straw-ejector, substantially as described.

2. The combination of a threshing mechanism, an endless traveling carrier comprising flexible endless elements, pulleys on which they operate and cross-slats connecting said flexible endless elements, a straw-ejector disposed within said carrier, above the lower lead thereof, and means operated by said carrier, to throw the straw from said lower lead of said carrier onto said straw-ejector, substantially as described.

3. In combination with an endless traveling carrier of the class described, a straw-ejecting worm disposed within said carrier above the lower lead thereof and beaters to throw the straw from the lower lead of said carrier onto said straw-ejecting worm, substantially as described.

4. An endless traveling straw-carrier of the class described, comprising a plurality of carrier-ropes spaced apart, couplings connecting the ends of said respective carrier-ropes, each of said couplings comprising a pair of sections, adjustably secured on the ends of one of said ropes and flexibly connected together, cross-slats connecting said carrier-ropes, supporting-shafts and pulleys on said shafts, and having peripheral grooves engaged by said carrier-ropes, substantially as described.

In testimony that I claim the foregoing as my own I have hereto affixed my signature in the presence of two witnesses.

JOHN LINDNER.

Witnesses:
C. J. EFFERTZ,
J. S. EFFERTZ.